(12) United States Patent
Szczucki

(10) Patent No.: US 9,205,591 B2
(45) Date of Patent: Dec. 8, 2015

(54) FINISH CUTTING OF A PLASTIC PART DURING A BLOW MOLDING CYCLE USING A GUILLOTINE BLADE

(71) Applicant: Salflex Polymers Limited, Weston (CA)

(72) Inventor: Ted Szczucki, Milton (CA)

(73) Assignee: Salflex Polymers Limited, Weston, Ontario (CA)

( * ) Notice: Subject to any disclaimer, the term of this patent is extended or adjusted under 35 U.S.C. 154(b) by 119 days.

(21) Appl. No.: 13/974,234

(22) Filed: Aug. 23, 2013

(65) Prior Publication Data

US 2015/0056323 A1 Feb. 26, 2015

(51) Int. Cl.
| | |
|---|---|
| *B29C 49/50* | (2006.01) |
| *B29C 49/42* | (2006.01) |
| *B29L 23/00* | (2006.01) |
| *B29C 49/04* | (2006.01) |

(52) U.S. Cl.
CPC ............ *B29C 49/4273* (2013.01); *B29C 49/50* (2013.01); *B29C 49/04* (2013.01); *B29C 2049/503* (2013.01); *B29C 2793/009* (2013.01); *B29C 2793/0027* (2013.01); *B29L 2023/00* (2013.01); *B29L 2023/22* (2013.01)

(58) Field of Classification Search
CPC ............ B29C 49/4273; B29C 49/4252; B29C 49/4268; B29C 2793/009
USPC ........................................................ 425/527
See application file for complete search history.

(56) References Cited

U.S. PATENT DOCUMENTS

| | | | |
|---|---|---|---|
| 5,910,283 A | 6/1999 | Hobson | |
| 6,719,554 B2 | 4/2004 | Hobson | |
| 2002/0066981 A1* | 6/2002 | Ogawa | ............... 425/527 |

FOREIGN PATENT DOCUMENTS

| | | | |
|---|---|---|---|
| EP | 139841 A1 | * | 5/1985 |
| FR | 2598114 A1 | * | 11/1987 |

OTHER PUBLICATIONS

Partial machine translation of FR 2598114 A1, published Nov. 1987, obtained from the esp@ce website.*

* cited by examiner

*Primary Examiner* — Robert B Davis
(74) *Attorney, Agent, or Firm* — Medler Ferro PLLC

(57) ABSTRACT

A mold tool and cutting system are described for in-mold cutting of a molded article. The cutting system comprises a blade assembly for incorporation into the mold tool, defining at least in part a cavity for forming a molded article, the blade assembly including an extendable cutting blade and a wedge slide. The wedge slide is capable of rearward displacement to expose the cutting blade. During a molding process, the wedge slide is displaced fully forward so as to present a continuous molding profile with adjacent molding surfaces. Following the molding process, the wedge slide is displaced rearwardly so as to expose the cutting blade. The cutting blade is then extended into the cavity to cut a molded article contained therein.

13 Claims, 8 Drawing Sheets

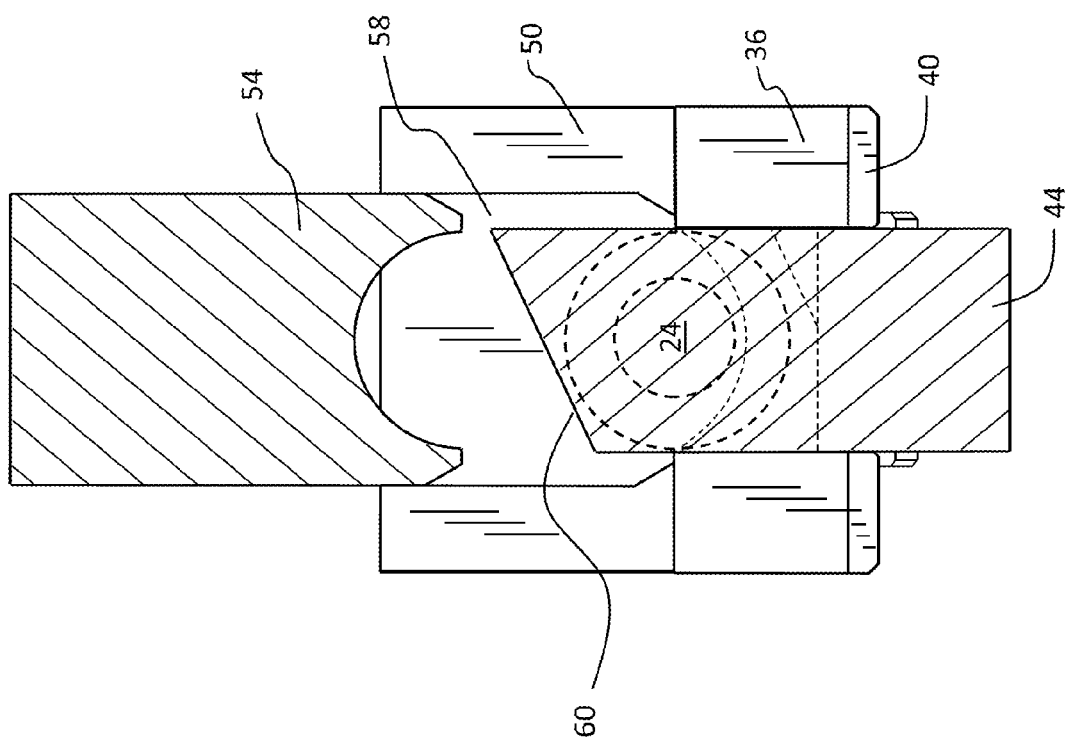

US 9,205,591 B2

FINISH CUTTING OF A PLASTIC PART DURING A BLOW MOLDING CYCLE USING A GUILLOTINE BLADE

FIELD OF THE INVENTION

The present invention relates to a method of manufacturing plastic blow-molded parts, and in particular to a method of in-mold finish cutting of the part during the blow-molding cycle.

BACKGROUND OF THE INVENTION

It is known and customary practice to subject molded articles, in particular blow molded articles to post-molding processing to remove flash and excess material. Post-mold processing such as trimming operations require additional time and resources, increasing overall labour requirements and consequently unit pricing on the molded article.

The incorporation of in-mold operations has the potential to decrease labour costs, and a shift to in-mold processing is evident in the plastics industry. Examples of in-mold operations in common use today are in-mold labelling, such as for the application of labels to consumer goods, and in-mold product assembly, such as for the assembly of articulating structures (i.e. medical syringes).

SUMMARY OF THE INVENTION

According to an aspect of an embodiment, provided is a cutting system for use in a mold tool. The cutting system comprises a blade assembly for incorporation into a mold tool defining at least in part a cavity for forming a molded article, the blade assembly including an extendable cutting blade and a wedge slide. The wedge slide is capable of rearward displacement to expose the cutting blade. During a molding process, the wedge slide is displaced fully forward so as to present a continuous molding profile with adjacent molding surfaces. Following the molding process, the wedge slide is displaced rearwardly so as to expose the cutting blade. The cutting blade is then extended into the cavity to cut a molded article contained therein.

According to another aspect of an embodiment, provided is a mold tool for forming a molded article. The mold tooling comprises a first mold half and a second mold half, the first and second mold halves jointly defining a cavity for forming the molded article. The mold tooling further comprises a cutting system including a blade assembly for incorporation into the first mold half. The blade assembly includes an extendable cutting blade and a wedge slide, the wedge slide being capable of rearward displacement to expose the cutting blade. During a molding process, the wedge slide is displaced fully forward so as to present a continuous molding profile with adjacent molding surfaces of the first mold half. Following the molding process, the wedge slide is displaced rearwardly so as to expose the cutting blade. The cutting blade is then extended into the cavity towards the second mold half to cut a molded article contained therein.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 8 is a partial sectional view of the cutting system shown in the third operational position, corresponding to FIG. 5.

DETAILED DESCRIPTION OF EMBODIMENTS OF THE PRESENT INVENTION

Figure 1:
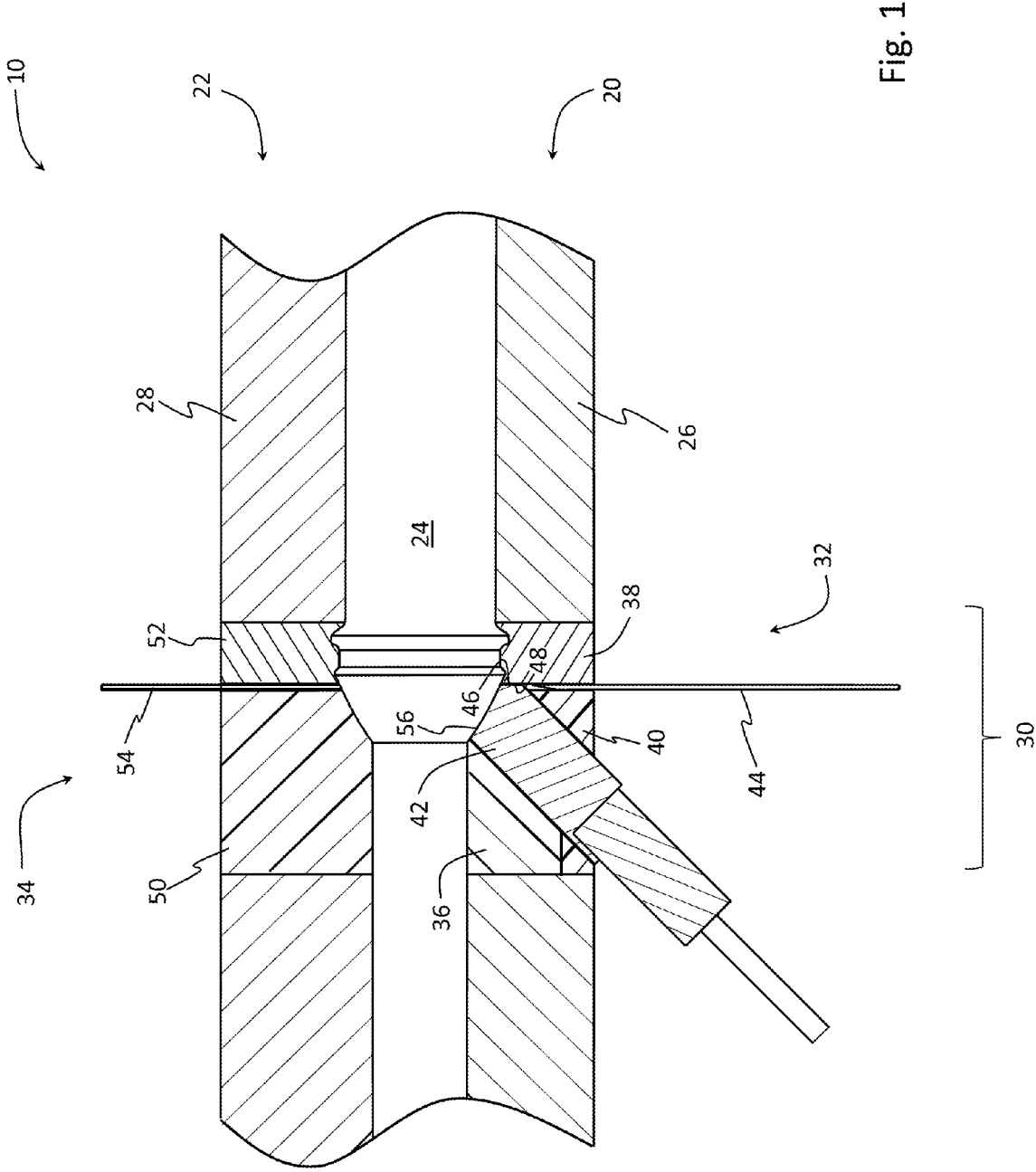
FIG. 1 is a cross-sectional view of the cutting system according to an embodiment of the invention, the cutting system shown in a first operational position.

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology in the form of a fluid conduit for automotive use, the invention may also be used in the manufacture of other automotive/non-automotive molded plastic structures such as air ducts, toys, etc. Furthermore, there is no intention to be bound by any expressed or implied theory presented in the preceding technical field, background, brief summary or the following detailed description.

For the purposes of this description, the term 'forward' is defined as displacement towards the mold cavity, and the term 'rearward' is defined as displacement away from the mold cavity.

Generally, the present invention is an in-mold cutting system configured to trim molded plastic articles. The in-mold cutting system includes a cutting blade that extends through the molding cavity to effect the trimming action. To reduce flash in the finished molded product in the region of the cutting blade, the cutting blade is maintained behind a sliding wedge during the molding process. The sliding wedge forms a part of the molding surface, and is slidably retracted following the molding operation to expose the cutting blade. Stated differently, the sliding wedge operates as a door behind which the cutting blade is retaining during the molding stage of the cycle. On retraction of the sliding wedge (i.e. opening of the door), the cutting blade can then be extended through the molded product to effect the cut. To ensure the cutting blade fully extends through the molded product, the blade passes through the molding cavity and into a pocket provided opposite the cutting blade. To prevent the ingress of molten plastic into this pocket, a retractable plug is provided, thus presenting a continuous molding profile to the parison during the molding cycle.

The cutting system is well suited for use in blow molding environments, where the formed plastic product is generally in the form of a hollow article. In general, an exemplary blow molding process begins with the extrusion of a parison. The parison is then positioned and sealed within a suitable mold tool. The mold tool provides a cavity corresponding to the desired plastic product to be formed. The sealed parison is then inflated, generally using air, to urge the parison against the contours of the cavity. On sufficient cooling, the mold tool is opened, and the formed plastic product is removed, and subject to post-mold processing (e.g. de-flashing), if necessary. The present invention is intended to be incorporated into the blow molding process, by providing a cutting function within the mold tool. In this way, at least one cut can be performed prior to mold opening and ejection of the formed part.

Turning now to FIG. 1, shown is a portion of a mold tool 10 for use in a blow molding machine. Mold tool 10 generally includes a first mold half 20, and a second mold half 22 that jointly define a mold cavity 24 for molding a desired plastic product. First mold half 20 is shown to include a first mold plate 26, while second mold half 22 is shown to include a second mold plate 28. Also shown is a cutting system 30 which includes a blade assembly 32 and a plug assembly 34.

Figure 2:
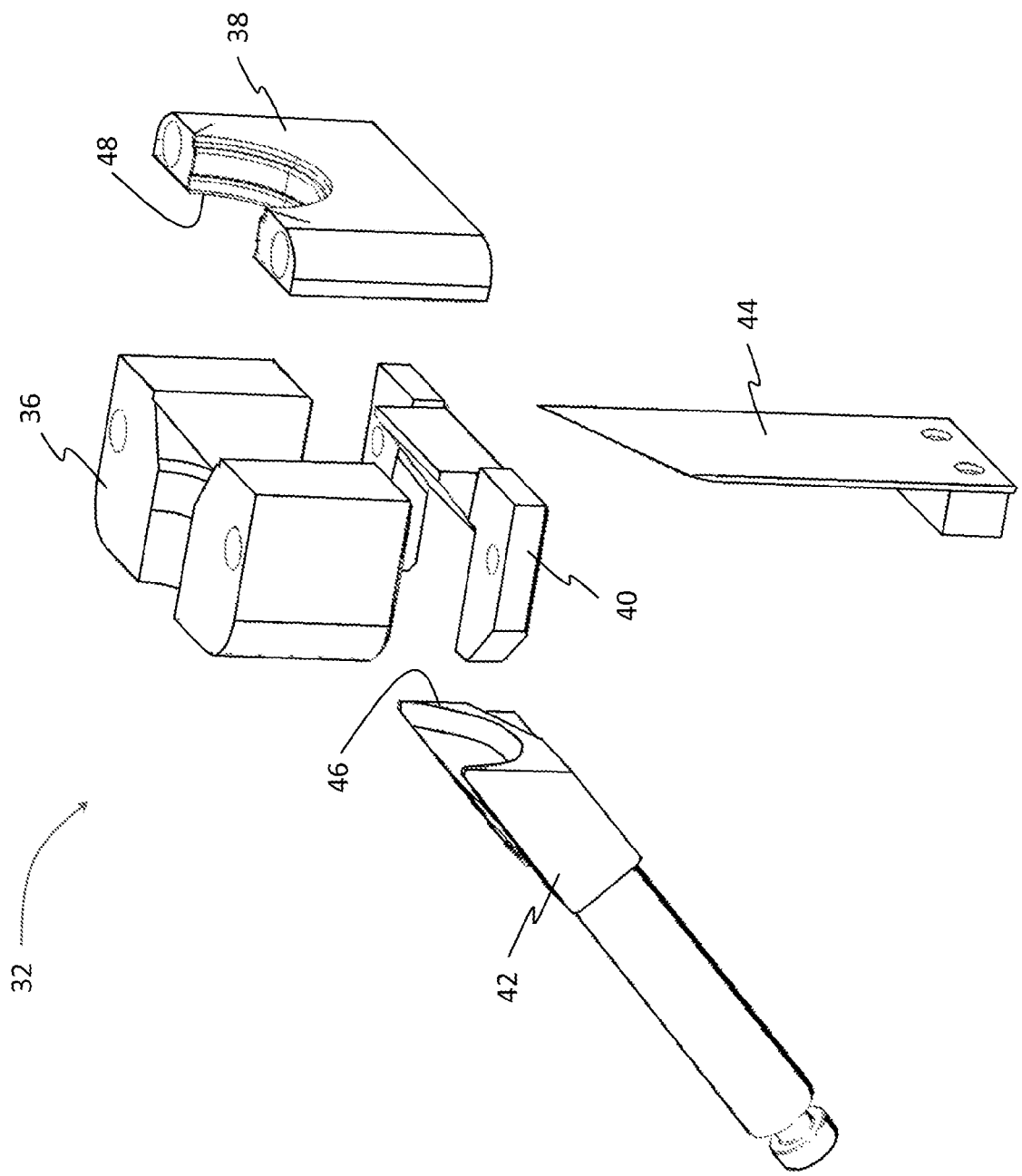
FIG. 2 is an exploded perspective view of the blade assembly of the cutting system of FIG. 1.

Referring now to FIG. 2, shown is a perspective exploded view of blade assembly 32, configured to be incorporated into first mold half 20 of mold tool 10. Blade assembly 32 generally includes a plurality of cutter inserts, in particular a first cutter insert 36 and a second cutter insert 38, as well as a slide support block 40. The assembly of these components (as best seen in FIG. 1) define channels for guiding a wedge slide 42 and a cutting blade 44 through forward/rearward displacement relative to cavity 24. As specifically shown, wedge slide 42 is guided/supported by way of slide surfaces provided on slide support block 40 and first cutter insert 36, while cutting blade 44 is guided/supported by way of slide surfaces provided on slide support block 40 and second cutter insert 38. Second cutter insert 38 also provides a forward stop for wedge slide 42, whereby sealing surface 46 of wedge slide 42 abuts against sealing surface 48 of second cutter insert 38 at the forward limit of displacement.

Figure 3:
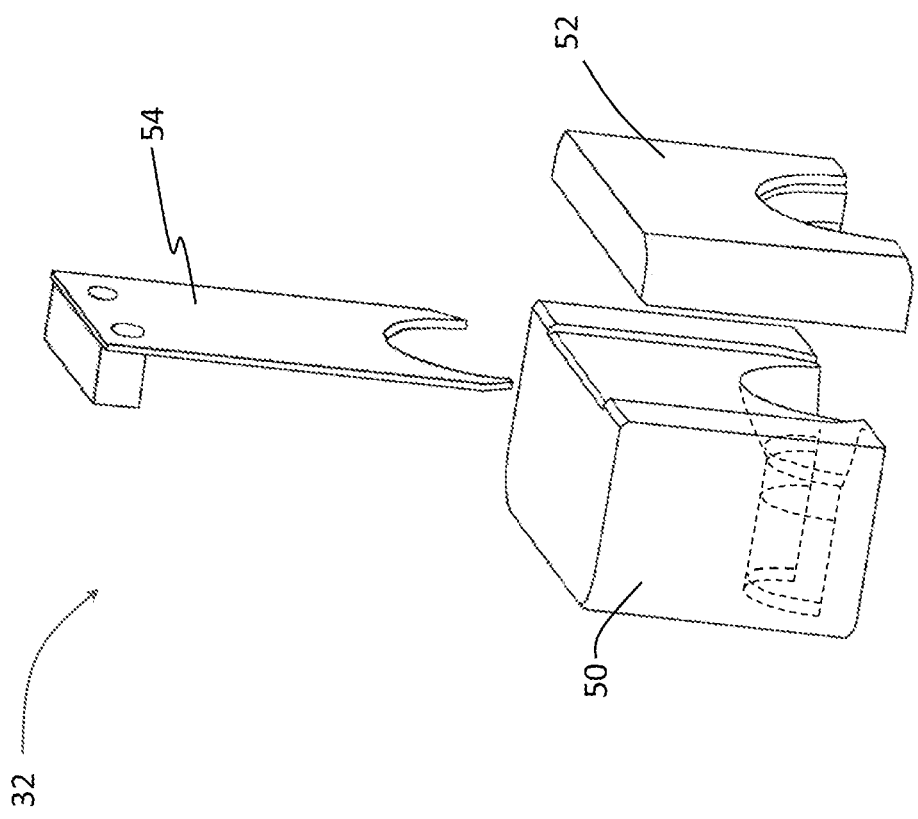
FIG. 3 is an exploded perspective view of the plug assembly of the cutting assembly of FIG. 1.

FIG. 3 provides a perspective view of plug assembly 34, configured to be incorporated into second mold half 22 of mold tool 10. Plug assembly 34 generally includes a plurality of plug inserts, in particular a first plug insert 50 and a second plug insert 52. The assembly of these components (as best seen in FIG. 1) define a channel for guiding a plug 54 through forward/rearward displacement relative to cavity 24. As specifically shown, plug 54 is guided/supported by way of slide surfaces provided on first plug insert 50, and second plug insert 52.

Returning now to FIG. 1, cutting system 30 is shown in a first operational position, in which cutting blade 44 is fully retracted, and wedge slide 42 is positioned fully forward to effectively separate cutting blade 44 from molding cavity 24. In this fully forward position, wedge slide 42 presents molding surface 56, and forms a continuous molding profile of cavity 24 with adjacently located first cutter insert 36 and second cutter insert 38. In this first operational position, plug 54 is also positioned fully forward to similarly form a continuous molding profile of cavity 24 with adjacently located first plug insert 50 and second plug insert 52. In turn, these components of cutting system 30 for a continuous molding profile with the mold plates defining first and second mold halves 20, 22. By maintaining a continuous molding profile, that is by presenting a cavity surface without substantial voids or recesses attributable to the cutting assembly, a molded plastic product with reduced flash can be achieved. To further facilitate this, the tolerance between sealing surfaces, for example sealing surface 46 of wedge slide 42 and sealing surface 48 of second mold plate 28 are sufficiently small to prevent the ingress of plastic material therein during the blow molding cycle.

Figure 4:
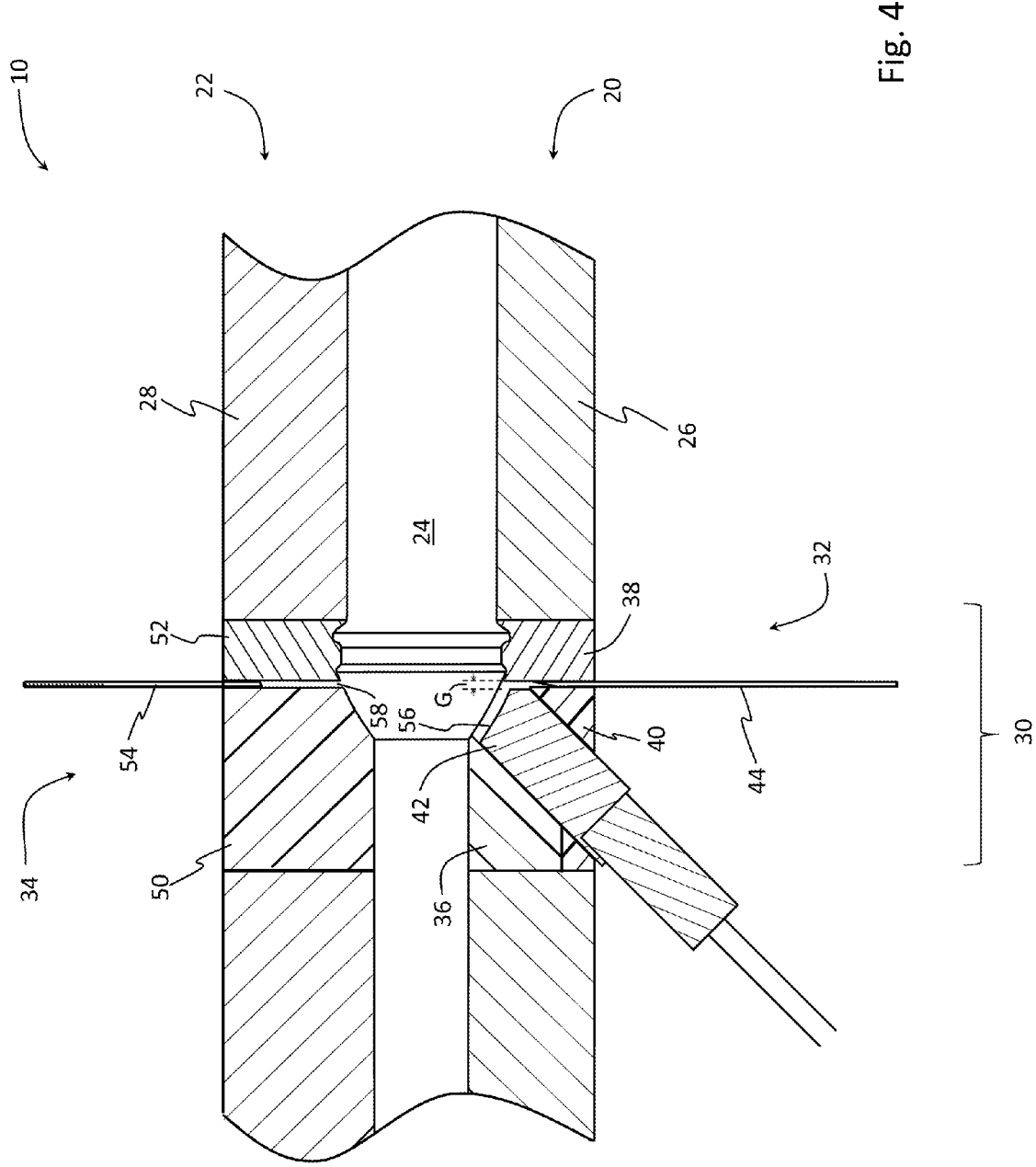
FIG. 4 is a cross-sectional view of the cutting system of FIG. 1 in a second operational position.

Referring now to FIG. 4, a second operational position is presented in which wedge slide 42 is displaced rearward, that is away from cavity 24. This second condition occurs once the blow molding stage of the overall molding cycle is complete, and the molded plastic part has sufficiently cooled. The displacement of wedge slide 42 exposes cutting blade 44 to cavity 24, through gap G created between wedge slide 42 and second mold plate 28. Also shown is the rearward displacement of plug 54, to expose recess 58 provided diametrically opposed to cutting blade 44.

Figure 5:
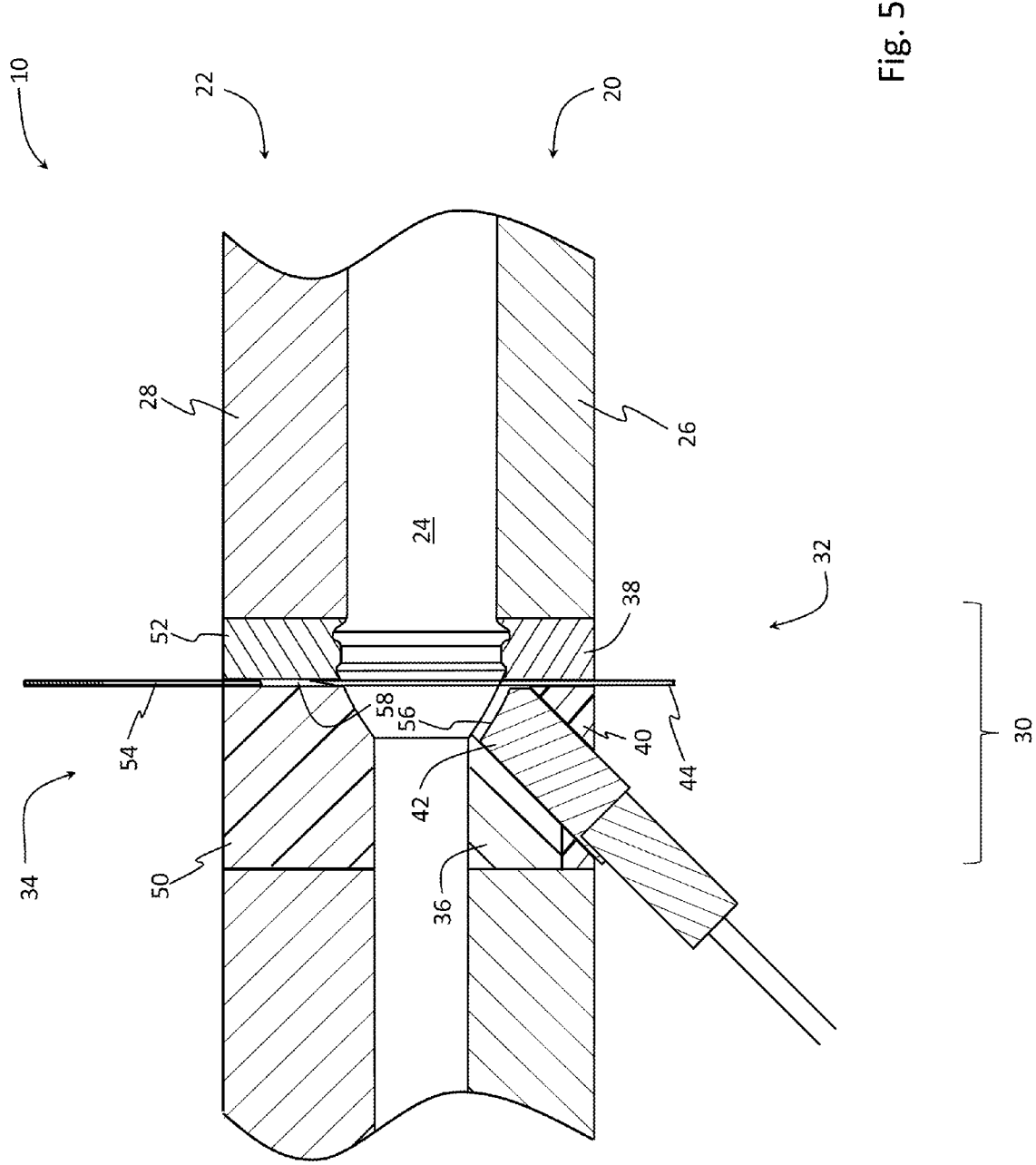
FIG. 5 is a cross-sectional view of the cutting system of FIG. 2 in a third operation position.

In a third and final operational position, as shown in FIG. 5, cutting blade 44 extends through cavity 24 sufficiently to enter recess 58. Extension of cutting blade through cavity 24 has the effect of cutting/trimming the molded plastic article, while still within the mold tool. As a result, post-mold processing of the molded article is reduced, resulting in lower manufacturing costs and quicker overall manufacturing time. On completion of the cutting action, cutting blade 44 is retracted into the first position, and wedge slide 42 and plug 54 are displaced forward to the aforementioned first operational position, in preparation of the next molding cycle.

Figure 6:
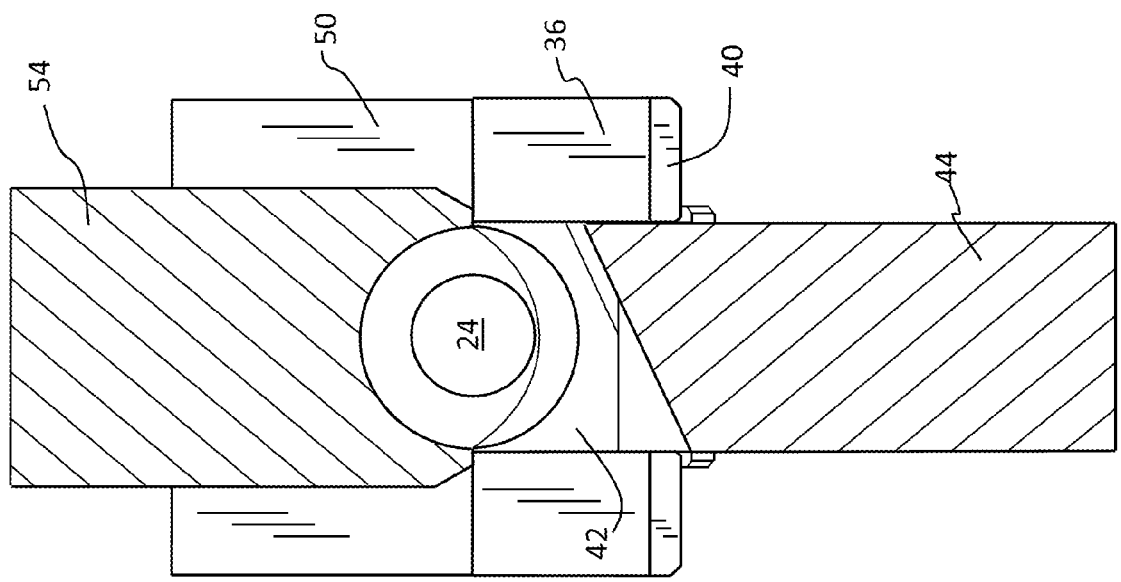
FIG. 6 is a partial sectional view of the cutting system shown in the first operational position, corresponding to FIG. 1.
Figure 7:
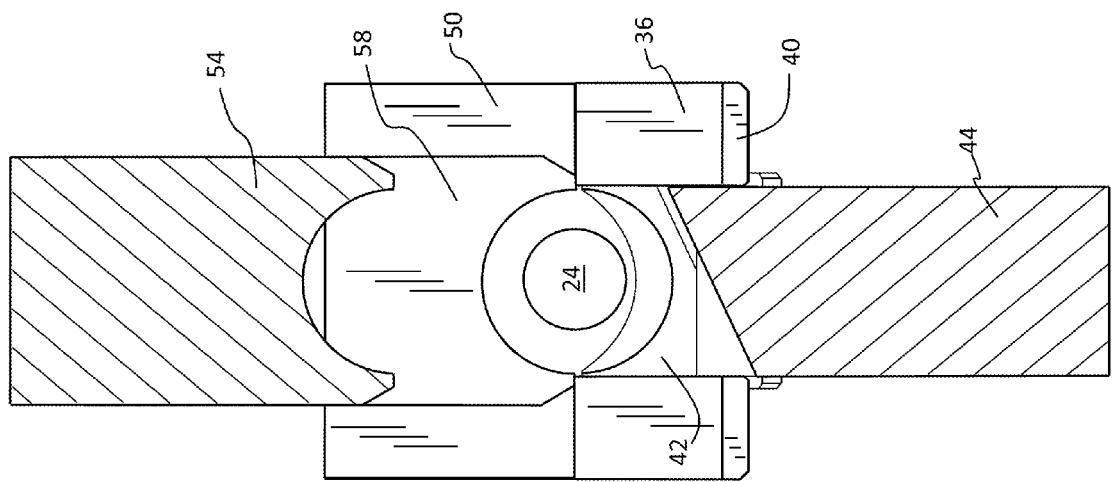
FIG. 7 is a partial sectional view of the cutting system shown in the second operational position, corresponding to FIG. 4.

Presented in FIGS. 6 to 8 is an alternate view of mold tool 10, and serves to illustrate the same operational positions as those detailed above. Referring first to FIG. 6, shown is the initial first operational position in which cutting blade 44 is fully retracted, and wedge slide 42 is positioned fully forward. Plug 54 is also in the fully forward position, thus forming the continuous molding profile detailed above. In this arrangement, the mold tool is operably readied for the blow molding cycle. The second operational position is shown in FIG. 7, in which wedge slide 42 is displaced rearward to expose cutting blade 44 to molding cavity 24. Also shown is the rearward displacement of plug 54 to expose recess 58. FIG. 8 illustrates the third operational position, in which cutting blade 44 extends through cavity 24 sufficiently to enter recess 58.

As seen for example in FIG. 8, cutting blade 44 is configured as a guillotine-style blade having angled leading cutting edge 60. The configuration of cutting edge 60 may vary depending on the application, but typical for this technology is the one-sided taper visible in FIGS. 1 and 2. As will be appreciated, the angle of the taper, as well as the implementation of other cutting edge styles (e.g. dual taper edge) may be dictated by the cutting performance desired, and the nature of the material being cut. In one embodiment, the blade is provided with 25° angled leading cutting edge 60, and a taper of 12°.

While the cutting system described above includes both the blade assembly and the plug assembly, there may be instances where the cutting system includes only the blade assembly incorporated into the mold tool. Variations in the implementation/arrangement of the blade and plug assemblies will be a function of the molded article to be formed. It will be appreciated that such variants in the cutting system and resulting mold tool are intended to fall within the scope of the invention.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-descried exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

The invention claimed is:

1. A cutting system for use in a mold tool, the cutting system comprising:
    a blade assembly for incorporation into a mold tool defining at least in part a cavity for forming a molded article, the blade assembly including an extendable cutting blade and a wedge slide,
    the wedge slide being capable of rearward displacement to expose the cutting blade,
    wherein during a molding process, the wedge slide is displaced fully forward so as to present a continuous molding profile with adjacent molding surfaces, and wherein following the molding process, the wedge slide is displaced rearwardly so as to expose the cutting blade, the cutting blade then extending into the cavity to cut a molded article contained therein,
    wherein the blade assembly further comprises a plurality of cutter inserts and a slide support block that defines channels for guiding the wedge slide and the cutting blade through forward/rearward displacement relative to the cavity.

2. The cutting system of claim 1, wherein the plurality of cutter inserts present molding surfaces that form part of the continuous molding profile of the cavity.

3. A cutting system for use in a mold tool, the cutting system comprising:
    a blade assembly for incorporation into a mold tool defining at least in part a cavity for forming a molded article, the blade assembly including an extendable cutting blade and a wedge slide, the wedge slide being capable of rearward displacement to expose the cutting blade; and
    a plug assembly for incorporation into the mold tool, the blade assembly being positioned within a first mold half of the mold tool, and the plug assembly being positioned within a corresponding second mold half of the mold tool, the first and second mold halves jointly defining the cavity,
    wherein during a molding process, the wedge slide is displaced fully forward so as to present a continuous molding profile with adjacent molding surfaces, and wherein following the molding process, the wedge slide is displaced rearwardly so as to expose the cutting blade, the cutting blade then extending into the cavity to cut a molded article contained therein.

4. The cutting system of claim 3, wherein the plug assembly includes a plug capable of rearward displacement, the plug being positioned within the mold tool diametrically opposed to the extendable cutting blade.

5. The cutting system of claim 4, wherein the plug assembly includes a plurality of plug inserts that define channels for guiding the plug through forward/rearward displacement relative to the cavity.

6. The cutting system of claim 5, wherein the plurality of plug inserts present molding surfaces that form part of the continuous molding profile of the cavity.

7. The cutting system of claim 4, wherein rearward displacement of the plug presents a recess in the second mold half, and wherein on forward displacement of the cutting blade, the cutting blade at least partially enters the recess so as to ensure a complete cutting action through the cavity.

8. A mold tool for forming a molded article, the mold tooling comprising:
    a first mold half and a second mold half, the first and second mold halves jointly defining a cavity for forming the molded article;
    a cutting system including a blade assembly for incorporation into the first mold half, the blade assembly including an extendable cutting blade and a wedge slide, the wedge slide being capable of rearward displacement to expose the cutting blade; and
    a plug assembly for incorporation into the second mold half, the plug assembly including a plug capable of rearward displacement away from the cavity, the plug being positioned within the mold tool diametrically opposed to the extendable cutting blade,
    wherein during a molding process, the wedge slide is displaced fully forward so as to present a continuous molding profile with adjacent molding surfaces of the first mold half, and wherein following the molding process, the wedge slide is displaced rearwardly so as to expose the cutting blade, the cutting blade then extending into the cavity towards the second mold half to cut a molded article contained therein.

9. A mold tool for forming a molded article, the mold tool comprising:
    a first mold half and a second mold half, the first and second mold halves jointly defining a cavity for forming the molded article; and
    a cutting system including a blade assembly for incorporation into the first mold half, the blade assembly including an extendable cutting blade and a wedge slide, the wedge slide being capable of rearward displacement to expose the cutting blade,
    wherein during a molding process, the wedge slide is displaced fully forward so as to present a continuous molding profile with adjacent molding surfaces of the first mold half, and wherein following the molding process, the wedge slide is displaced rearwardly so as to expose the cutting blade, the cutting blade then extending into the cavity towards the second mold half to cut a molded article contained therein,
    wherein the blade assembly further comprises a plurality of cutter inserts and a slide support block that defines channels for guiding the wedge slide and the cutting blade through forward/rearward displacement relative to the cavity.

10. The mold tool of claim 9, wherein the plurality of cutter inserts present molding surfaces that form part of the continuous molding profile of the cavity.

11. The mold tool of claim 8, wherein the plug assembly includes a plurality of plug inserts that define channels for guiding the plug through forward/rearward displacement relative to the cavity.

12. The mold tool of claim 11, wherein the plurality of plug inserts present molding surfaces that form part of the continuous molding profile of the cavity.

13. The mold tool of claim 8, wherein rearward displacement of the plug presents a recess in the second mold half, and wherein on forward displacement of the cutting blade, the cutting blade at least partially enters the recess so as to ensure a complete cutting action through the cavity.

* * * * *